United States Patent
Chen et al.

(10) Patent No.: US 9,612,890 B2
(45) Date of Patent: Apr. 4, 2017

(54) METHOD AND APPARATUS FOR WORKFLOW BASED HIGH AVAILABILITY ANALYSIS

(75) Inventors: Ying Chen, Beijing (CN); Jing Luo, Beijing (CN); John Arthur Pershing, Jr., Cortlandt Manor, NY (US); Jie Qiu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1846 days.

(21) Appl. No.: 12/062,872

(22) Filed: Apr. 4, 2008

(65) Prior Publication Data

US 2009/0254894 A1   Oct. 8, 2009

(51) Int. Cl.
*G06F 11/20* (2006.01)
*G06F 11/00* (2006.01)

(52) U.S. Cl.
CPC .................................. *G06F 11/008* (2013.01)

(58) Field of Classification Search
CPC ....................................................... G06F 11/20
See application file for complete search history.

(56) References Cited

U.S. PATENT DOCUMENTS

| | | | |
|---|---|---|---|
| 5,960,404 A | 9/1999 | Chaar et al. | |
| 6,744,769 B1 * | 6/2004 | Siu | H04L 12/42 370/222 |
| 6,782,408 B1 | 8/2004 | Chandra et al. | |
| 7,110,364 B1 * | 9/2006 | Le | H04L 12/42 370/242 |
| RE39,717 E | 7/2007 | Yates et al. | |
| 7,246,254 B2 | 7/2007 | Alur et al. | |
| 7,599,947 B1 * | 10/2009 | Tolbert et al. | |
| 7,917,467 B2 * | 3/2011 | Kemmer et al. | 707/609 |

(Continued)

FOREIGN PATENT DOCUMENTS

| | | |
|---|---|---|
| EP | 1693763 | 8/2006 |
| WO | WO2004014045 | 2/2004 |

OTHER PUBLICATIONS

K. Birman et al., "Adding High Availability and Autonomic Behavior to Web Services," Procs. of the 26th International Conference on Software Engineering (ECSE'04), 2004, 10 pages.

(Continued)

*Primary Examiner* — Kurtis Gills
(74) *Attorney, Agent, or Firm* — Kurt Goudy; Ryan, Mason & Lewis, LLP

(57) ABSTRACT

Techniques are disclosed for workflow based high availability analysis in computing systems. For example, a computer-implemented method for analyzing an information network infrastructure to identify one or more availability weak points includes the following steps. A workflow specification is provided based on one or more user-visible processes and an application topology. Service workflows associated with the specification are mapped from the application topology to the infrastructure to generate a workflow data structure. An availability weak point analysis is performed in accordance with the workflow data structure to determine one or more optimal high availability parameters for one or more deployed components of the infrastructure. The one or more optimal high availability parameters are applied in the infrastructure so as to substantially eliminate the one or more availability weak points.

20 Claims, 5 Drawing Sheets

(56) References Cited

U.S. PATENT DOCUMENTS

| | | |
|---|---|---|
| 2002/0178081 A1 | 11/2002 | Omoto et al. |
| 2003/0115311 A1 | 6/2003 | Johnston-Watt et al. |
| 2006/0023688 A1 | 2/2006 | Kilian-Kehr et al. |
| 2006/0155708 A1 | 7/2006 | Brown et al. |
| 2006/0224399 A1* | 10/2006 | Alkemper et al. ............. 705/1 |
| 2006/0259451 A1* | 11/2006 | Gibbons ......................... 707/1 |
| 2006/0259453 A1* | 11/2006 | Gibbons et al. ............... 707/1 |
| 2007/0143166 A1* | 6/2007 | Leymann et al. .............. 705/8 |
| 2007/0179820 A1 | 8/2007 | Gaster |
| 2008/0065455 A1* | 3/2008 | Sun et al. ....................... 705/8 |
| 2008/0071807 A1* | 3/2008 | Pappu et al. ................ 707/100 |
| 2008/0201397 A1* | 8/2008 | Peng et al. .................. 708/308 |
| 2008/0221834 A1* | 9/2008 | Damodharan .............. 702/183 |
| 2009/0132586 A1* | 5/2009 | Napora et al. ............ 707/104.1 |
| 2011/0023049 A1* | 1/2011 | Dettinger et al. ........... 718/105 |
| 2011/0137702 A1* | 6/2011 | Hodges et al. ............ 705/7.27 |

OTHER PUBLICATIONS

"Constrained Optimization," The Substituted Method, Chapter 2, pp. 37-45.

G. Candea et al., "Designing for High Availability and Measurability," Procs. of the 1st Workshop on Evaluating and Architecting System Dependability (EASY), Jul. 2001, 5 pages.

M. Kamath et al., "Providing High Availability in Very Large Workflow Management Systems," The Fifth International Conference on Extending Database Technology (EDBT '96), Mar. 1996, 16 pages, France.

\* cited by examiner

METHOD AND APPARATUS FOR WORKFLOW BASED HIGH AVAILABILITY ANALYSIS

FIELD OF THE INVENTION

The present invention relates generally to computing system evaluation and, more particularly, to techniques for workflow based high availability analysis in such computing systems.

BACKGROUND OF THE INVENTION

The basic principle of high availability is to eliminate single points of failure or availability weak points by providing redundancy. From an end-user perspective, the availability requirement is usually defined on a high-level process such as order processing or accounts receivable. These kinds of high-level processes are running on the Information Technology (IT) infrastructure and each process may cross different components in the IT infrastructure. Taking the typical J2EE (Java 2 Enterprise Edition) application as the example, it may cross three-tiered IT infrastructure: web tier, middleware tier, database tier. Therefore, the HA requirement of a high-level process is usually satisfied by several different low level IT components working together. To provide a global HA solution for a group of high-level processes with the minimum cost is a significant challenge.

In other words, the challenges can be interpreted as how to deliver cost-effective solutions for each component in the infrastructure according to different high-level availability requirements from different end-user processes. For example, if the HA capability of a component is not enough, it could result in costly outages, but if the HA capability is too much, it could be an expensive waste.

Accordingly, it would be highly desirable to appropriately perform availability analysis over the distributed IT deployment infrastructure in conjunction with high-level requirements, and further plan for high availability solutions over the deployed components in the IT infrastructures.

SUMMARY OF THE INVENTION

Principles of the invention provide techniques for workflow based high availability analysis in such computing systems.

In one illustrative embodiment, a computer-implemented method for analyzing an information network infrastructure to identify one or more availability weak points comprises the following steps. A workflow specification is provided based on one or more user-visible processes and an application topology. Service workflows associated with the specification are mapped from the application topology to the infrastructure to generate a workflow data structure. An availability weak point analysis is performed in accordance with the workflow data structure to determine one or more optimal high availability parameters for one or more deployed components of the infrastructure. The one or more optimal high availability parameters are applied in the infrastructure so as to substantially eliminate the one or more availability weak points.

These and other objects, features and advantages of the present invention will become apparent from the following detailed description of illustrative embodiments thereof, which is to be read in connection with the accompanying drawings.

DETAILED DESCRIPTION

While principles of the present invention will be described herein in the context of a practical, real-world application such as IT service management, the invention is not so limited. For example, principles of the invention can be applied to any system of interdependent components providing one or more useful services, where these services have specific availability requirements and where the availability of these services depends on the availability of the individual components.

Principles of the invention provide a workflow-based "availability weak point" analysis methodology. In particular, we propose a framework to analyze the availability weak points and give indications for optimal high availability (HA) solutions to IT components over the global deployment topology. The framework can decide which components in the topology need to be HA enhanced, and to what level they should be enhanced to satisfy the user (workflow) level HA requirements and meanwhile make the overall cost close to the minimum.

Figure 1A:
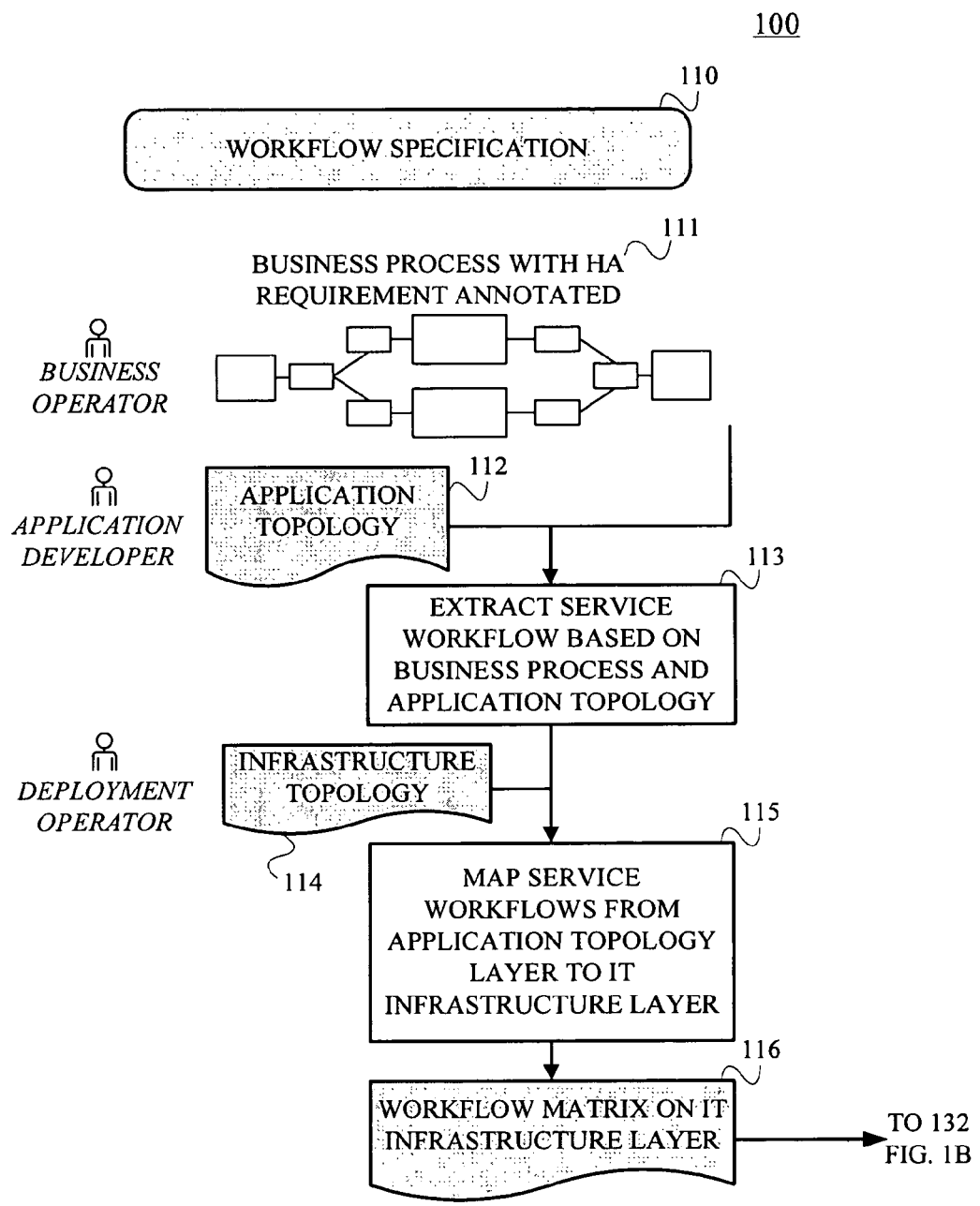
FIG. 1 is a block diagram illustrating the overall architecture for workflow based high availability analysis, according to an embodiment of the invention.
Figure 1:
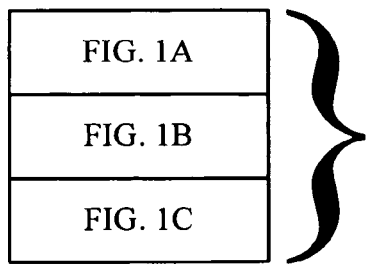
Figure 1B:
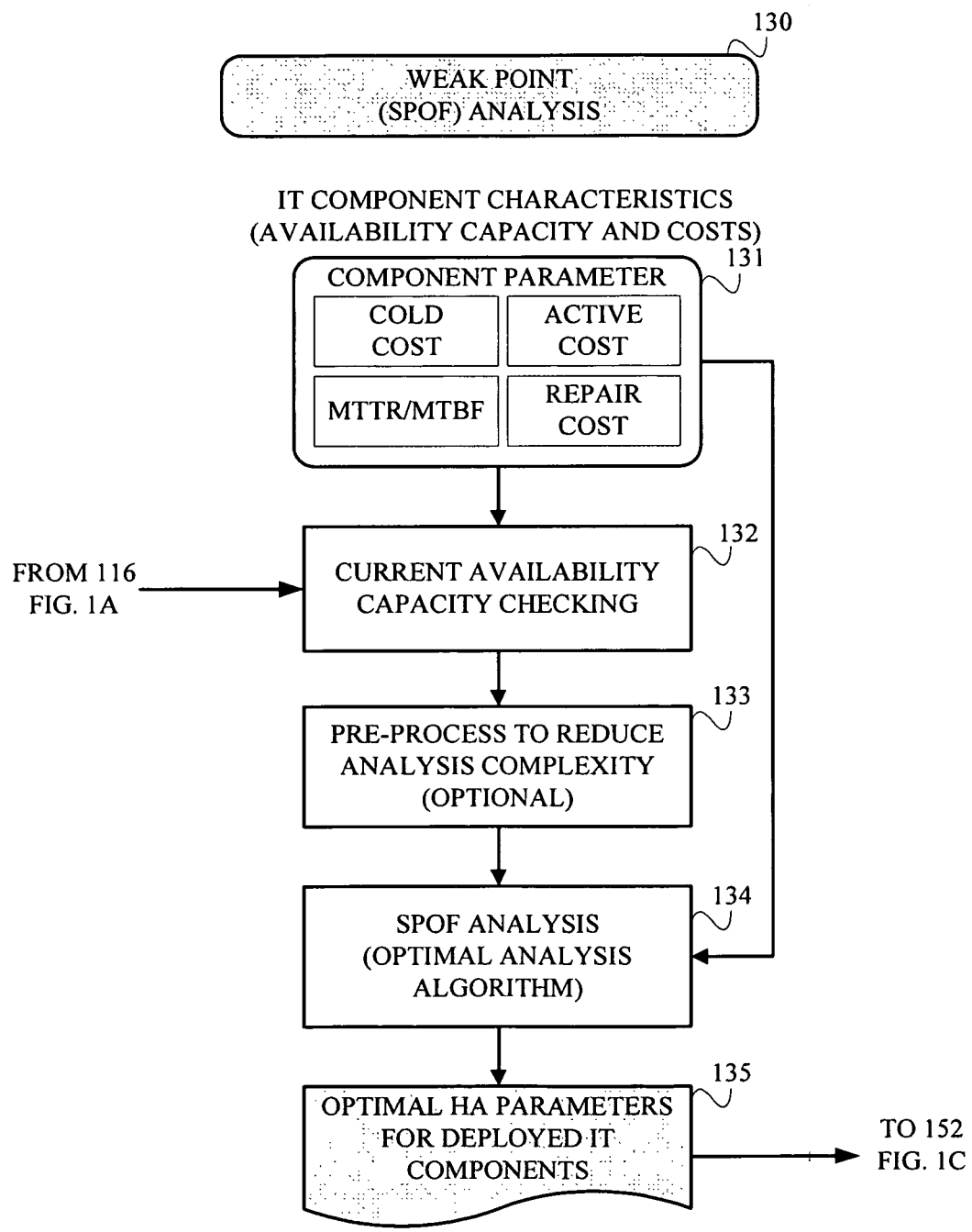
Figure 1C:
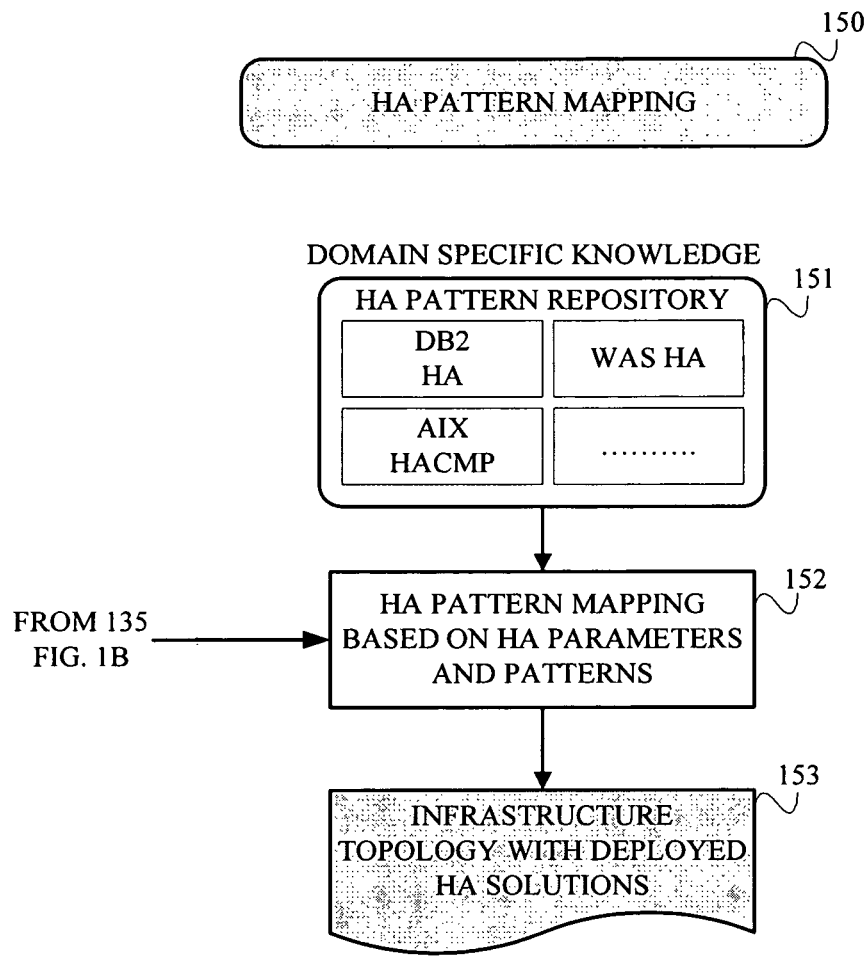

The overall availability weak point analysis framework is shown in FIG. 1. The framework 100 includes the three modules: workflow specification module 110; weak point analysis module 130; and HA pattern mapping module 150. Each of the modules is described below in detail.

Workflow specification module 110 extracts services workflows from the end-user-visible processes (111) and the application topology (112) which implements the services required by the end-user-visible process (step 113).

Firstly, the initial service workflows are extracted from the user-visible processes, but the service workflow is not completed yet, since part of the workflow is usually defined on the application topology, for example: (1) one application may invoke another application's service in the application topology, but this kind of information is not defined in the user-visible process; (2) one application may require database services in the application topology, but usually this kind of information is not defined in the user-visible process.

Secondly, a completed service workflow is defined based on the application topology, with the internal relationships of the application topology being added into the service workflow.

Thirdly, the service workflow on the application topology is mapped (step 115) to the IT infrastructure layer (defined by the infrastructure topology 114), and the corresponding IT component workflow is constructed, which is called the workflow matrix (116).

In the IT component workflow matrix, the row information corresponds to the user-visible processes, the column information corresponds to the various IT components, and each workflow derived from the user-visible processes will cross several different IT components. In the end-user-visible process definition stage, its high availability requirement is specified; the availability requirement can be expressed as equal to MTBF/(MTBF+MTTR), where the MTBF depicts mean time between failure, and MTTR depicts mean time to repair, so the availability requirement actually lies in the range between 0 and 1. Thus, the workflow specification module finally outputs the IT component workflows with the HA requirement defined on the user-visible process.

In one embodiment of workflow-based weak point analysis, we leverage Business Process Execution Language (BPEL—see Business Process Execution Language for Web Services, version 1.1, ws-bpel specification, the disclosure of which is incorporated by reference) to specify the user-visible processes associated with application services. Based on the BPEL processes, we can map them to the application service workflow according to the application topology and further map the service workflow to IT component workflow according to the hosting relationships between applications, middleware, operating systems, and IT components.

Figure 2:
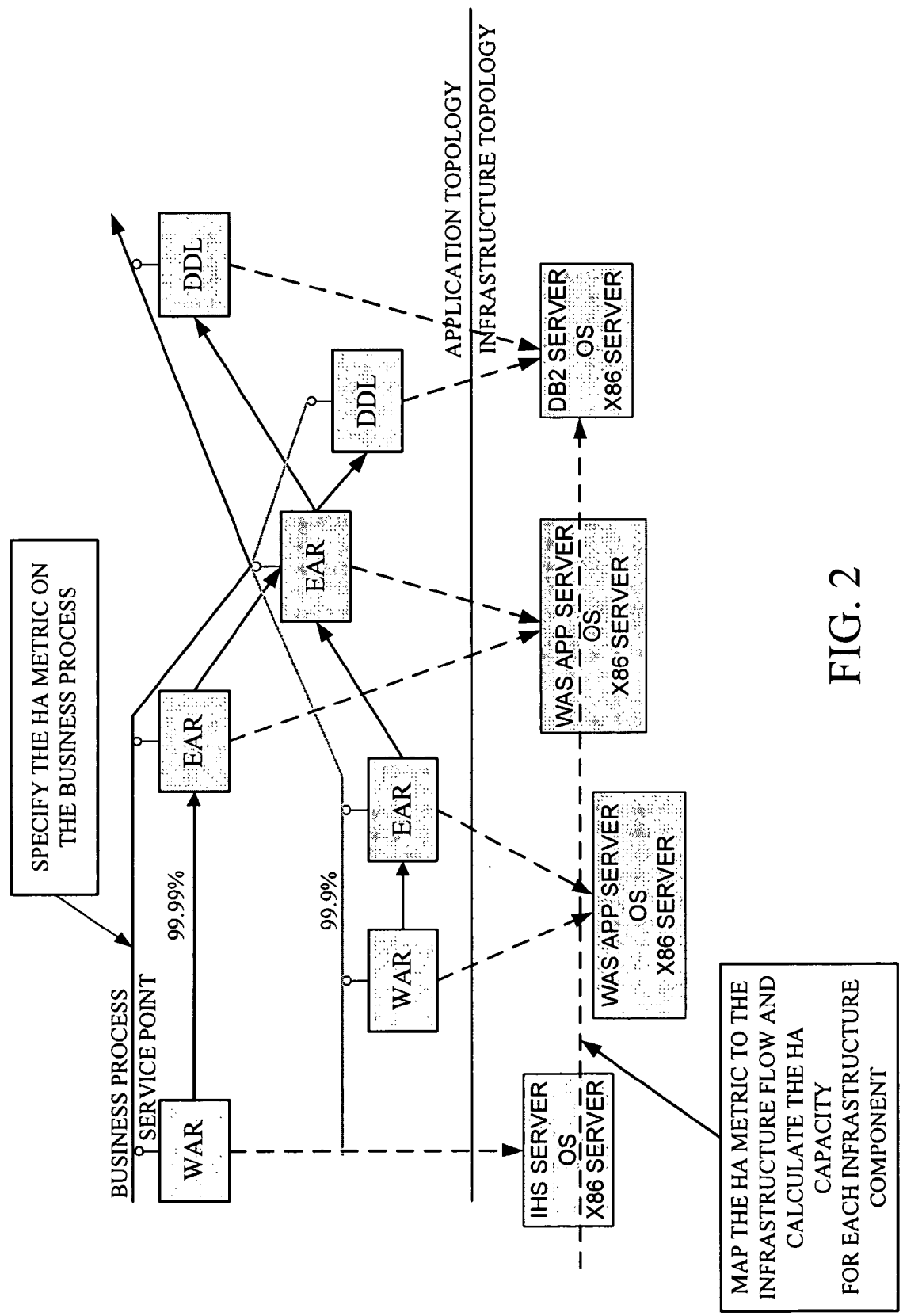
FIG. 2 is a block diagram illustrating workflow mapping, according to an embodiment of the invention.

As FIG. 2 shows, the hosting relationships are specified over the basic deployment topology; through the host relationships, workflow 1 and workflow 2 are mapped to the IT infrastructure level. So through the workflow mapping phase, we can finally extract the relevant IT components list at the IT infrastructure level for each user-visible process.

Returning to FIG. 1, the weak point analysis module 130 does weak point analysis based on IT component workflows mapped from the user-visible processes. The module calculates the optimal solution with minimum overall cost while meeting the user level availability requirements. The optimal solution suggests which IT components need to be HA enhanced and how much capacity the IT components should be enhanced (such as size of the cluster for an IT component).

More particularly, SPOF analysis module 130 first calculates (step 132) current availability capability for each IT component according to realistic parameters (131) obtained from the manufacturer and/or historical experience (such as failure rates or MTBF, MTTR).

Then, the module checks whether the availability requirement for each workflow has been satisfied. For those unsatisfied workflows, the IT components where the relevant services are deployed are analyzed to determine the optimal or near-optimal enhancement to their availability characteristics, e.g., by deploying well-known techniques such as clustering or failover to a standby system. This is essentially a constrained multivariate optimization problem, with the availability requirements determining the constraints and (typically) optimizing to minimize cost. In one embodiment, the size of this optimization problem may first be reduced (133) to reduce the computational complexity. One such reduction involves calculating the "weight" of each IT resource based on the number of workflows which reference this resource and the availability requirements of those workflows, and only consider those IT resources with the largest weight.

The weak point analysis module calculates (134) the optimal HA solution for each to-be-improved IT component over the whole infrastructure topology subject to the optimization criteria (which will typically be the incremental cost of the HA improvement). Module 130 outputs the HA enhancement parameters for each of the relevant IT components (135).

In one embodiment, based on the IT component workflows and their corresponding HA requirements derived from the user-visible processes, the weak point analysis algorithm (134) constructs an equality and inequality system to express all the HA requirement constraints on the IT component workflows; meanwhile a cost function is designed to express the cost of the overall HA enhancement. Based on the equality and inequality system, and cost function, a mathematical algorithm is used to calculate which IT component(s) should be HA enhanced and how much capacity should be improved. In one embodiment, this calculation can be performed efficiently using the method of Lagrange multipliers (see Dimitri P. Bertsekas, "Constrained Optimization and Lagrange Multiplier Methods", 1996, ISBN 1-886529-04-3, the disclosure of which is incorporated by reference herein).

The HA pattern mapping module 150 maps (step 152) the HA patterns to the relevant IT resources according to the optimal solution parameters combined with domain knowledge (151) of relevant HA patterns, either generic (e.g., "clustering", "failover") or product-specific (e.g., "DB2 High Available for Disaster Recovery", "WebSphere High Availability"). This module finally outputs an HA enhanced deployment topology (153) which satisfies the user level availability requirement and requires the minimum overall cost.

Accordingly, as explained above, a key contribution of our weak-point analysis methodology is the usage of user-level workflow specifications to specify availability requirements and to map the flow of transactions through the IT infrastructure. In the section below, we describe in further detail the weak point analysis methodology, which is responsible for recommending HA solutions such that user-level availability requirements are met, while keeping the overall cost close to the minimum. In this methodology, first, the current availability capability for each workflow is calculated according to the component failure behavior parameters obtained from historical experience (such as MTBF, MTTR); then, it checks whether the availability requirement for each workflow has been satisfied and, for those unsatisfied workflows, the resources where the relevant services are deployed should have their availability enhanced through the application of appropriate HA patterns as previously mentioned.

For a given workflow mapped across an IT infrastructure, the availability should be calculated to determine whether it can satisfy the user level HA requirements. A definition of availability can be flexible, i.e., largely based on what types of downtimes one chooses to consider in the analysis. As a result, there are a number of different classifications of availability, such as Instantaneous (or Point) Availability, Average Up-Time Availability (or Mean Availability), and Steady State Availability which is the most commonly quoted availability metric for most computer systems. Herein, availability is measured by the uptime ratio, which is a close approximation of the steady state availability value and represents the percentage of time a computer system is available throughout its useful life. The uptime ratio metric is defined through the formula: uptime ratio=MTBF/(MTBF+MTTR) where MTBF represents mean time between failures and MTTR represents mean time to repair, so the availability capability actually lies in the range from 0 and 1 (in reality, it may lie in the range from 0.9 to 1). For availability calculation of one independent resource component, we assume that the parameters (MTBF, MTTR) and even the uptime ratio itself can be acquired from historical experience or product documentations directly.

With the obtained availability metrics for each type of individual resource component, the availability calculation for an infrastructure workflow are based on the following three calculation patterns.

Hosting pattern calculation is for the situation where a failure of any component in the hosting stack results in failure for the hosted component(s). For example, a service hosting stack is usually composed of middleware, an operating system, and a physical server. Thus, the availability of a hosting stack can be calculated as:

$$P(HS) = \prod_{j=1}^{m} (P(RC_j)) \quad (1)$$

where $P(HS)$ is the availability capability for hosting stack HS which includes m resource components, and $P(RC_j)$ is the availability capability of resource component $RC_j$.

Dependency pattern calculation is for the situation where a failure of any resource in the dependency chain results in failure for all "upstream" (dependent) resources. For example, a typical dependency chain is a three-tier web hosting architecture including a web server hosting stack, an application server hosting stack, and a database server hosting stack. Thus the availability of a dependency chain can be calculated as:

$$P(DC) = \prod_{j=1}^{m} (P(HS_j)) \quad (2)$$

where $P(DC)$ is the availability capability for dependency chain DC which links m hosting stack, and $P(HS_j)$ is the availability capability of hosting stack $HS_j$. Usually, a dependency chain represents an infrastructure workflow.

Group pattern calculation is for the situation where at least one resource in a group (e.g., HA cluster) has to be available for the system to be available. For example, an application server cluster is composed of m application server hosting stacks, all of which provide the same capabilities and host the same applications. Thus, the availability of a group can be calculated as:

$$P(RG) = 1 - \prod_{j=1}^{m} (1 - P(HS_j)) \quad (3)$$

where $P(RG)$ is the availability capability for resource group RG which contains m hosting stack resources, and $P(HS_j)$ is the availability capability of hosting stack resource $HS_j$. Usually, a resource group represents a HA pattern.

In an example including three hosting stacks, one resource group, and a dependency chain which is the infrastructure workflow derived from the workflow, the availability capability may be calculated as:

$$P(W)=P(DC_1)=P(RG_1)P(HS_3)=(1-(1-P(HS_1))(1-P(HS_2)))P(HS_3) \quad (4)$$

Given the workflow-resource relationship matrix, we can calculate the current availability capability for each workflow according to its resource list. Assume that the availability of the m resources are $P(C_1)$, $P(C_2)$, $P(C_3)$, ..., $P(C_m)$: these availabilities can be derived from historical measurements or, perhaps, from data obtained from the manufacturer. For this scenario, we assume that the relevant resources are all standalone (no groups), so we can calculate the current availability for each workflow as formula (5) shows:

$$P(W_i) = \prod_{j=1}^{m} (P(C_j)^{R_{i,j}}) \quad (5)$$

where $P(W_i)$ is the current availability capability for workflow $W_i$. We compare it with the workflow's availability requirement $P_i$: if $P(W_i) \geq P_i$, the requirement is met; otherwise, the availability requirement is unsatisfied, and some resources in the resource list of workflow $W_i$ need to have their availability enhanced through the deployment of an HA pattern to meet the availability requirement. This is an optimization problem: which resources should be enhanced for availability to meet the availability requirement, while keeping HA enhancement cost as low as possible?

A simple method of addressing an optimization problem is by enumerating all possible solutions and comparing their cost; however, this approach is computationally expensive for all but the simplest problems, and is sometimes unsolvable when the number of resources is large. Our weak-point analysis methodology calculates a near-optimal solution for HA enhancement using the method of Lagrange multipliers, as explained above, which is a compute-effective approach.

Assume the number of workflows whose availability requirements have not yet been met is n; for workflow $W_i$ we define the enhancement parameter $PW_i$ as the amount by which that workflow's current availability needs to be enhanced to meet the availability requirement $P_i$:

$$PW_i = \frac{P_i}{P(W_i)} \quad (6)$$

By definition, $PW_i \geq 1$. We also define the enhancement parameter for each resource as $PC_1, PC_2, \ldots, PC_m$; thus, we form the following constraints:

$$\begin{cases} PW_1 \leq PC_1^{R_{1,1}} \cdot PC_2^{R_{1,2}} \cdot \ldots \cdot PC_m^{R_{1,m}} \\ PW_2 \leq PC_1^{R_{2,1}} \cdot PC_2^{R_{2,2}} \cdot \ldots \cdot PC_m^{R_{2,m}} \\ \ldots \\ PW_i \leq PC_1^{R_{i,1}} \cdot PC_2^{R_{i,2}} \cdot \ldots \cdot PC_m^{R_{i,m}} \\ \ldots \\ PW_n \leq PC_1^{R_{n,1}} \cdot PC_2^{R_{n,2}} \cdot \ldots \cdot PC_m^{R_{n,m}} \end{cases} \quad (7)$$

In other words, the overall availability enhancement for the IT resources within the workflow should be no less than the availability enhancement requirement for the workflow. We take the logarithm of the inequalities (7) to simplify the calculation, yielding:

$$\begin{cases} \ln(PW_1) \le R_{1,1} \cdot \ln(PC_1) + \ldots + R_{1,m} \cdot \ln(PC_m) \\ \ln(PW_2) \le R_{2,1} \cdot \ln(PC_1) + \ldots + R_{2,m} \cdot \ln(PC_m) \\ \ldots \\ \ln(PW_i) \le R_{i,1} \cdot \ln(PC_1) + \ldots + R_{i,m} \cdot \ln(PC_m) \\ \ldots \\ \ln(PW_n) \le R_{n,1} \cdot \ln(PC_1) + \ldots + R_{n,m} \cdot \ln(PC_m) \end{cases} \quad (8)$$

We let $\ln(PC_1), \ln(PC_2), \ldots, \ln(PC_m)$ as $X_1, X_2, \ldots, X_m$, there exists $$0 \le X_i \le \ln\left(\frac{1}{P(C_i)}\right) \text{ because } 1 \le PC_i \le \frac{1}{P(C_i)},$$

for the failover HA pattern where only one primary server and one standby server exist in the cluster, we can adjust the upper bound to $$\ln\left(\frac{1-(1-P(C_i))^2}{P(C_i)}\right)$$

and we can adjust the lower bound from 0 to $$\ln\left(\frac{1-(1-P(C_i))^{n_i}}{P(C_i)}\right)$$

if we want the initial cluster size to be $n_i$ instead of 1, and we let $\ln(PW_1), \ln(PW_2), \ldots, \ln(PW_n)$ as $B_1, B_2, \ldots, B_n$, therefore the following constraints should be satisfied:

$$\begin{cases} B_1 \le R_{1,1} \cdot X_1 + \ldots + R_{1,m} \cdot X_m \\ B_2 \le R_{2,1} \cdot X_1 + \ldots + R_{2,m} \cdot X_m \\ \ldots \\ B_i \le R_{i,1} \cdot X_1 + \ldots + R_{i,m} \cdot X_m \\ \ldots \\ B_n \le R_{n,1} \cdot X_1 + \ldots + R_{n,m} \cdot X_m \\ 0 \le X_1 \le \ln\left(\frac{1}{P(C_1)}\right) \\ 0 \le X_2 \le \ln\left(\frac{1}{P(C_2)}\right) \\ \ldots \\ 0 \le X_m \le \ln\left(\frac{1}{P(C_m)}\right) \end{cases} \quad (9)$$

The above constraint forms a continuous region for the solutions in the multi-dimensional space $S(X_1, X_2, X_3, \ldots, X_m)$ We utilize a utility function $f$ to depict the overall cost for HA enhancement, and we have proven that the closed lower boundaries of the solution space will include the optimal solution for the minimum enhancement cost, i.e., the closed lower boundaries of the solution region in the multi-dimensional space $S(X_1, X_2, X_3, \ldots, X_m)$ will include the optimal solution $P_{opt}$. Therefore, we can achieve the optimal solution for the utility function subject to the constrained solution space of the closed lower boundaries.

Therefore, the closed lower boundaries for the constraint space can be expressed with an equation $g(X_1, X_2, \ldots, X_m)=0$, $g(X_1, X_2, \ldots, X_m)$ can be a piecewise function to depict the different closed boundaries.

The optimal HA enhancement solution is eventually determined by the overall utility function. The utility function for the specified resource $C_i$ is associated with two parameters: $n_i$, the original HA cluster size of resource $C_i$ (for standalone resources, $n_i$ is set to 1), and $X_i$, the enhancement parameter for resource i. Therefore, the utility function for resource $C_i$ can be expressed as $f_i(n_i, X_i)$, and the overall cost will be as follows:

$$f(X_1, X_2, \ldots, X_m) = \quad (10)$$
$$f_1(n_1, X_1) + f_2(n_2, X_2) + \ldots + f_m(n_m, X_m) = \sum_{i=1}^{m} f_i(n_i, X_i)$$

The utility function $f_i(n_i, X_i)$ can be defined like this as an example:

$$f_i(n_i, X_i) = E_i(n_i' - n_i) \quad (11)$$

In the above equation, $n_i'$ denotes the cluster size of resource $C_i$ after HA enhancement, and $E_i$ denotes the cost for availability enhancement per unit; it can include the initial fixed cost for purchasing hardware and software, and the annual maintenance cost. The utility function is determined by the service providers who want to provide appropriate IT resources to support their services at appropriate cost; thus, it may vary according to their demands. Now, we can calculate $n_i'$ according to $X_i$ and we can get the example utility function as equation (12):

$$\begin{cases} P'(C_i) = 1 - (1 - P(C_i))^{n_i'} \\ P'(C_i) = P(C_i) \cdot PC_i \\ X_i = \ln(PC_i) \end{cases} \quad (12)$$
$$\Rightarrow n_i' = \left\lceil \frac{\ln(1 - P(C_i) \cdot e^{X_i})}{\ln(1 - P(C_i))} \right\rceil$$

In the above formula $P'(C_i)$ denotes the enhanced availability for resource $C_i$, and $P(C_i)$ denotes the availability of one single resource. Therefore the optimal solution can be calculated with the utility function subject to the constraint depicted by equation $g(X_1, X_2, \ldots, X_m)=0$. Following the Lagrange multiplier method, we construct the auxiliary function $F(X_1, X_2, \ldots, X_m, \lambda)$ to calculate the optimal solution, defining it as equation (13) shows, where $f(X_1, X_2, \ldots, X_m)$ denotes the utility function, and $g(X_1, X_2, \ldots, X_m)$ denotes the function for the constraint space:

$$F(X_1, X_2, \ldots, X_m, \lambda) = f(X_1, X_2, \ldots, X_m) \quad (13)$$

By calculating the following partial derivatives according to the Lagrange multiplier method, we can finally get the optimal solution $(X_1, X_2, \ldots, X_m)$. ($\partial/\partial X$ F denotes to calculate the partial derivative function for F according to the variable X.)

$$\begin{cases} \frac{\partial}{\partial X_1} F(X_1, X_2, \ldots, X_m, \lambda) = 0 \\ \frac{\partial}{\partial X_2} F(X_1, X_2, \ldots, X_m, \lambda) = 0 \\ \ldots \\ \frac{\partial}{\partial \lambda} F(X_1, X_2, \ldots, X_m, \lambda) = 0 \end{cases} \quad (14)$$

According to the optimal solution for resource HA enhancement $(X_1, X_2, \ldots, X_m)$, we can get the enhanced availabilities $(P'(C_1), P'(C_2), \ldots, P(C_m))$, and the exact HA solutions can be found (e.g., whether a cluster should be constructed and what is the size of cluster). Assume there should be n members to support the HA cluster; the availability capability for the cluster should be as follows:

$$P'(C_i) = 1 - (1 - P(C_i))^n \qquad (15)$$

According to the above formula, the size n of the cluster can be calculated as follows:

$$n = \left\lceil \frac{\ln(1 - P'(C_i))}{\ln(1 - P(C_i))} \right\rceil \qquad (16)$$

Leveraging the domain information for the component, the HA cluster pattern can be generated and deployed into the topology.

Because the number of candidate resources for availability enhancement over the IT infrastructure can be large, it increases the computational complexity of calculating the optimal solutions by solving equations (14). Therefore, we propose a method to effectively reduce the number of candidate resources, in order to simplify the calculation.

The principle of our weight-based optimization approach (step 133) is to select a subset of the IT resources, based on weight, for use in the optimal solution calculation. We note that, for those resources which are involved in more workflows with more critical availability requirements, enhancing the availability of these resources will yield better overall HA enhancement for the workflows, in a cost-efficient manner. Therefore, we propose a weight-based method to select relevant resources as follows: for resource $C_j$, we define the weight for $C_j$ calculated as:

$$W(C_j) = \sum_{i=1}^{n} (R_{i,j} \cdot P_i) \qquad (17)$$

In the above formula, $R_{i,j}$ denotes the integer value defined in the workflow-resource mapping matrix. $P_i$ denotes the availability requirement of workflow $W_i$. In this way, the priority list of resources can be determined according to the weight. Those resources which support more workflows and more availability-critical workflows will have higher weights. According to the priority list, the top q resources can be selected to calculate the HA solution; the calculated solution will be a near optimal solution for only the q candidate resources which are taken into consideration, but the calculation complexity can be greatly reduced according to the selected number q.

Figure 3:
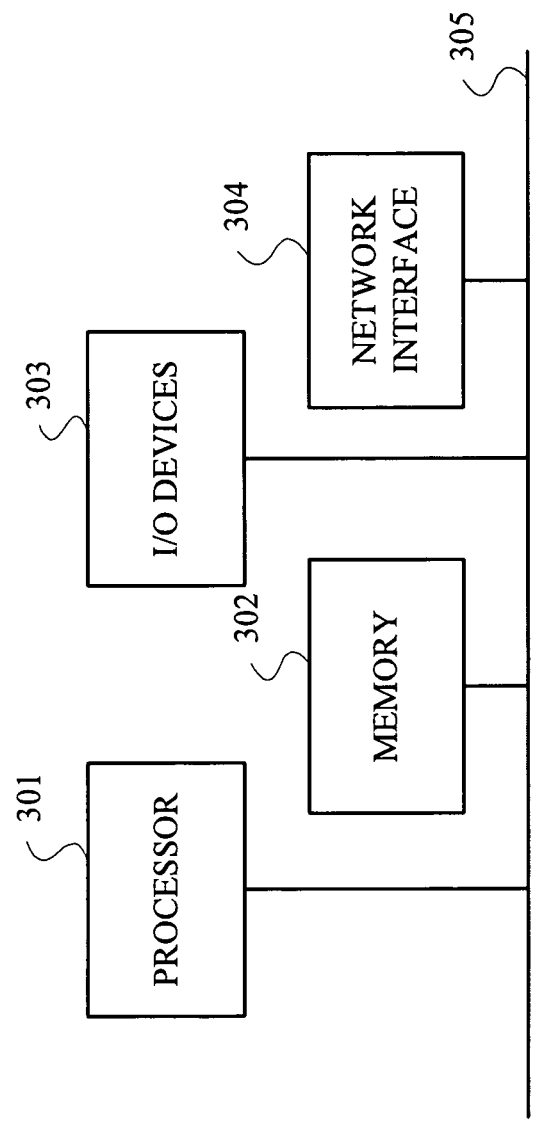
FIG. 3 is a block diagram illustrating a computing system in accordance with which one or more components/steps of a workflow based high availability analysis system may be implemented, according to an embodiment of the invention.

Lastly, FIG. 3 illustrates a computing system in accordance with which one or more components/steps of the workflow based high availability analysis techniques (e.g., components and methodologies described in the context of FIGS. 1 through 2) may be implemented, according to an embodiment of the present invention. It is to be understood that the individual components/steps may be implemented on one such computing system or on more than one such computing system. In the case of an implementation on a distributed computing system, the individual computer systems and/or devices may be connected via a suitable network, e.g., the Internet or World Wide Web. However, the system may be realized via private or local networks. In any case, the invention is not limited to any particular network.

Thus, the computing system shown in FIG. 3 may represent one or more servers or one or more other processing devices capable of providing all or portions of the functions described herein.

As shown, the computing system architecture may comprise a processor 301, a memory 302, I/O devices 303, and a network interface 304, coupled via a computer bus 305 or alternate connection arrangement.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Accordingly, as explained above, workflow based availability weak point analysis, according to the invention, maps high level high availability requirements to the IT infrastructure. It can help to identify the weak point(s) of the current IT infrastructure according to these HA requirements, meanwhile it can help to calculate the HA gap with minimum cost of each weak point in the IT infrastructure. That is techniques of the invention provide that the high level HA requirements are mapped from the user-visible processes to the IT infrastructure topology by workflow specification and mapping. The workflow based HA requirement analysis detects the weak point in the infrastructure and gives the HA enhancement rate and parameters. An HA solution can be generated based on the HA enhancement rate and parameters.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-implemented method comprising:
deploying an information network infrastructure comprising a plurality of deployed components on one or more computer nodes operating in a computer network;
executing a computerized process for analyzing the operation of the information network infrastructure over the computer network to identify at least one availability weak point of the deployed components of the information network infrastructure, wherein analyzing the operation of the information network infrastructure comprises:
   determining a set of initial service workflows using information derived from both (i) one or more user-visible processes that are executed by users of the information network infrastructure and (ii) an application topology which implements services used by the user-visible processes;
   determining internal relationships between applications in the application topology, wherein the internal relationships include invocations by one application of services of another application operating in the computer network;
   defining a complete service workflow specification for the application topology by adding the determined internal relationships to the initial service workflows;
   mapping the service workflow specification for the application topology to a topology of the information network infrastructure to generate a workflow data structure, wherein the workflow data structure comprises a component workflow data structure that provides information regarding a corresponding set of deployed components of the information network infrastructure, which are utilized by each of the user-visible processes that are executed by users of the information network infrastructure to perform a workflow of transactions through the information network infrastructure; and
   performing an availability weak point analysis using the workflow data structure to determine one or more optimal high availability parameters for one or more of the deployed components of the information network infrastructure, wherein the one or more optimal high availability parameters comprises a parameter that specifies an amount to increase a capacity of one or more of the deployed components of the information network infrastructure; and
modifying the information network infrastructure by applying the one or more optimal high availability parameters to the one or more of the deployed components in the information network infrastructure so as to substantially eliminate one or more availability weak points in the one or more user-visible processes that are executed by users of the information network infrastructure,
wherein the method is performed by executing program instructions by a computer.

2. The method of claim 1, wherein the workflow data structure comprises a workflow matrix.

3. The method of claim 2, wherein the workflow matrix comprises row information that corresponds to the one or more user-visible processes and column information that corresponds to the one or more deployed components of the information network infrastructure.

4. The method of claim 1, wherein the one or more high availability parameters comprise a measure of mean time between failure and a measure of mean time to repair for the one or more deployed components.

5. The method of claim 1, wherein the step of performing an availability weak point analysis further comprises calculating a current availability capability for each of the one or more deployed components.

6. The method of claim 5, wherein the current availability calculation is performed in accordance with one or more parameters obtained from a manufacturer of the component or a historical experience attributable to the component.

7. The method of claim 5, wherein the step of performing an availability weak point analysis further comprises checking whether an availability requirement for each workflow has been satisfied.

8. The method of claim 7, wherein, for an unsatisfied workflow, one or more of the deployed components in the corresponding set of deployed components for that workflow are analyzed to determine an enhancement to their availability characteristics.

9. The method of claim 8, wherein a given deployed component is weighted based on the number of workflows which reference the given deployed component such that the deployed components with the largest weights are analyzed.

10. The method of claim 8, wherein a given enhancement to a given deployed component is specified based on a cost function that considers an overall enhancement effect across the infrastructure.

11. Apparatus comprising:
a memory; and
a processor operatively coupled to the memory and configured to:
deploy an information network infrastructure comprising a plurality of deployed components on one or more computer nodes operating in a computer network;
execute a computerized process for analyzing the operation of the information network infrastructure over the computer network to identify at least one availability weak point of the deployed components of the information network infrastructure, wherein analyzing the operation of the information network infrastructure comprises:
   determining a set of initial service workflows using information derived from both (i) one or more user-visible processes that are executed by users of the information network infrastructure and (ii) an application topology which implements services used by the user-visible processes;
   determining internal relationships between applications in the application topology, wherein the internal relationships include invocations by one application of services of another application operating in the computer network;
   defining a complete service workflow specification for the application topology by adding the determined internal relationships to the initial service workflows;
   mapping the service workflow specification for the application topology to a topology of the information network infrastructure to generate a workflow data structure, wherein the workflow data structure comprises a component workflow data structure that provides information regarding a corresponding set of deployed components of the information network infrastructure, which are utilized by each of the user-visible processes that are executed by users of the information network infrastructure to perform a workflow of transactions through the information network infrastructure; and performing an availability weak point analysis using the workflow data structure to determine one or more optimal high availability parameters for one or more of the deployed components of the information network infrastructure, wherein the one or more optimal high availability parameters comprises a parameter that specifies an amount to increase a capacity of one or more of the deployed components of the information network infrastructure; and modify the information network infrastructure by applying the one or more optimal high availability parameters to the one or more of the deployed components in the information network infrastructure so as to substantially eliminate one or more availability weak points in the one or more user-visible processes that are executed by users of the information network infrastructure.

12. The apparatus of claim 1, wherein the workflow data structure comprises a workflow matrix, and the workflow matrix comprises row information that corresponds to the one or more user-visible processes and column information that corresponds to the one or more deployed components of the information network infrastructure.

13. The apparatus of claim 11, wherein the one or more high availability parameters comprise a measure of mean time between failure and a measure of mean time to repair for the one or more deployed components.

14. The apparatus of claim 11, wherein performing an availability weak point analysis further comprises calculating a current availability capability for each of the one or more deployed components.

15. The apparatus of claim 14, wherein the current availability calculation is performed in accordance with one or more parameters obtained from a manufacturer of the component or a historical experience attributable to the component.

16. The apparatus of claim 14, wherein performing an availability weak point analysis further comprises checking whether an availability requirement for each workflow has been satisfied.

17. The apparatus of claim 16, wherein, for an unsatisfied workflow, one or more of the deployed components in the corresponding set of deployed components for that workflow are analyzed to determine an enhancement to their availability characteristics.

18. The apparatus of claim 17, wherein a given deployed component is weighted based on the number of workflows which reference the given deployed component such that the deployed components with the largest weights are analyzed.

19. The apparatus of claim 17, wherein a given enhancement to a given deployed component is specified based on a cost function that considers an overall enhancement effect across the infrastructure.

20. An article of manufacture comprising a non-transitory computer readable storage medium including one or more programs which, when executed by a computer system perform the steps of:

deploying an information network, infrastructure comprising a plurality of deployed components on one or more computer nodes operating in a computer network;

executing a computerized process for analyzing the operation of the information network infrastructure over the computer network to identify at least one availability weak point of the deployed components of the information network infrastructure, wherein analyzing the operation of the information network infrastructure comprises:

determining a set of initial service workflows using information derived from both (i) one or more user-visible processes that are executed by users of the information network infrastructure and (ii) an application topology which implements services used by the user-visible processes;

determining internal relationships between applications in the application topology, wherein the internal relationships include invocations by one application of services of another application operating in the computer network;

defining a complete service workflow specification for the application topology by adding the determined, internal relationships to the initial service workflows;

mapping the service workflow specification for the application topology to a topology of the information network infrastructure to generate a workflow data structure, wherein the workflow data structure comprises a component workflow data structure that provides information regarding a corresponding set of deployed components of the information network infrastructure, which we utilized by each of the user-visible processes that are executed by users of the information network, infrastructure to perform a workflow of transactions through the information network infrastructure; and performing an availability weak point analysis using the workflow data structure to determine one or more optimal high availability parameters for one or more of the deployed components of the information network infrastructure, wherein the one or more optimal high availability parameters comprises a parameter that specifies an amount to increase a capacity of one or more of the deployed components of the information network infrastructure; and modifying the information network infrastructure by applying the one or more optimal high availability parameters to the one or more of the deployed components in the information network infrastructure so as to substantially eliminate one or more availability weak points in the one or more user-visible processes that are executed by users of the information network infrastructure.

* * * * *